United States Patent [19]

Manuali

[11] 3,720,888

[45] March 13, 1973

[54] DIODE SWITCHING ARRANGEMENTS COMPRISING THREE-POSITION SWITCHING MEANS

[75] Inventor: Bertrand Claude Marcel Jean Manuali, Villera-sur-Orge, France

[73] Assignee: Centre National D'Eutdes Spatiales, Paris, France

[22] Filed: Dec. 22, 1970

[21] Appl. No.: 100,685

[30] Foreign Application Priority Data

Dec. 24, 1969 France ................................6944894

[52] U.S. Cl. .......................333/7, 307/243, 307/259, 343/854

[51] Int. Cl. ..............................................H01p 1/10

[58] Field of Search ........333/7, 97 S, 98 S; 343/853, 343/854; 307/243, 244, 259

[56] References Cited

UNITED STATES PATENTS

| | | | |
|---|---|---|---|
| 3,321,717 | 5/1967 | Harper | 343/853 |
| 3,503,014 | 3/1970 | Hall et al. | 333/7 |
| 2,981,832 | 4/1961 | Mattson | 333/97 S X |
| 3,346,822 | 10/1967 | Levy et al. | 333/7 |

*Primary Examiner*—Paul L. Gensler
*Attorney*—Brufsky, Staas, Breiner & Halsey

[57] ABSTRACT

A switching device for HF energy which includes, at a distance of λ/4 from the branching point of one path or circuit into two transmission paths, connections to ground by a switching diode. These diodes may be so biased as to establish communication from the first path to one or other of the two other ones, or to two further transmission paths.

2 Claims, 3 Drawing Figures

DIODE SWITCHING ARRANGEMENTS COMPRISING THREE-POSITION SWITCHING MEANS

The invention relates generally to the field of electrical components such as switches, and more particularly to devices and circuits for switching high-frequency energy.

The invention is more particularly though not exclusively concerned with switching very high-frequency energy so as to apply it to a single path or circuit from several paths, or to apply the energy to a plurality of paths from a single path. Such problems are met with in systems of components for transmitting and/or receiving antennas, for example the systems described in the U.S. Ser. No. 709,764 of Mar. 1, 1968, now U.S. Pat. No. 3,560,975, which constitute practical examples of aircraft antennas used for air navigation.

The invention has as a primary object the provision of simple and comparatively economical switching devices and switching circuits which fulfil functions more extensive than those of previously known devices and circuits. In particular, it will be seen that the invention makes it possible, in an embodiment of a switching system for subsidiary antenna networks or for the radiating elements of an antenna network, for example for the application mentioned above, to effect the appropriate distribution of energy over the entirety of the radiating surface while still reducing the number of switches required for the said distribution. This makes it possible to obtain, in the case of antenna networks associated with electronic sweeping, the large deflections in the beam that are, in particular, necessary for radio-electrical links between aircraft and satellites.

With this in view, the elementary switching device for high-frequency energy according to the invention comprises at distances of $\lambda/4$ on either side of the branching point of a single high-frequency transmission path into two other transmission paths, a connection of each of said two other paths to earth through a switching diode, each of the said two diodes being provided with separate means to switch over their state of conduction or non-conduction, the arrangement being such that a high-frequency link may be established at will between the transmission path mentioned initially and one or other of the two said other transmission paths, or between the transmission path mentioned initially and the two said other transmission paths simultaneously.

The invention furthermore relates to circuits which make it possible to embody combinations of such elementary switching devices, the advantages and characteristics of which will emerge more clearly hereinafter.

The invention will be further explained in the following description of a preferred practical embodiment, which is given by way of non-limitative example, reference also being made to the accompanying drawing, in which.

Figure 1:
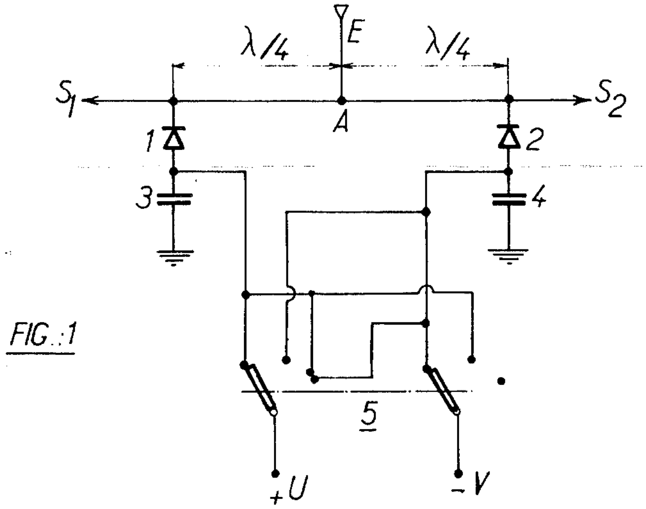
FIG. 1 illustrates in a diagrammatic manner an example of a switching and distributing assembly according to the invention.

If reference is made first of all to FIG. 1, it will be seen that an antenna feeds at E (for example by way of ordinary lines or of waveguides) two outputs $S_1$, $S_2$. At electrical distances $\lambda/4$ on either side of the input A there are mounted switching diodes 1 and 2, P.I.N. diodes for example. These diodes are connected to earth, at their remote ends, by capacitors 3, 4 respectively. If diode 1 receives at a point intermediate of the connection from capacitor 3 a bias of such a kind that it is itself polarized in the forward direction, and if diode 2 is similarly given a reverse bias, the diode 1 brings about a short-circuit on the line, a short-circuit which, returned to A, corresponds to a very large series impedance, while the diode 2 forms a very large parallel impedance along the transmission line, so that the energy is switched to circuit $S_2$. By reversing the bias, the energy is switched to circuit $S_1$ ; finally, if the two diodes 1 and 2 are reverse-biased simultaneously, the energy is divided between circuits $S_1$ and $S_2$.

This threefold possibility has been shown in FIG. 1 through the employment of a switch 5, having three positions which make it possible :

either to apply a voltage $+U$ to diode 1 and a voltage $-V$ to diode 2 ;

or to apply a voltage $+U$ to diode 2 and $-V$ to diode 1 ;

or to apply a voltage $+U$ to both the diodes. In given cases, it would also be possible to apply a voltage simultaneously to the two diodes in order to block the two outputs $S_1$ and $S_2$, this being in accordance with a fourth position of the switch. For the sake of convenience, the two blades of the switch have been made to interlock mechanically, though this is not indispensible.

It will also be noted that the switching and distributing assembly is able to operate in the reverse direction, $S_1$ and $S_2$ becoming the inputs and E a common output.

In practice, the switching and distributing assembly will be embodied in a three-plate circuit with a dielectric substrate of glass coated with Teflon, the diodes being connected in on the line and earthed through the agency of the potting unit. In practice, in order to achieve a substantially constant adaptation as regards loads of 50 Ω for each of the instances concerning switching or distribution, the two arms of the T formed by the distributor will have an impedance of about 60 Ω.

Figure 2:
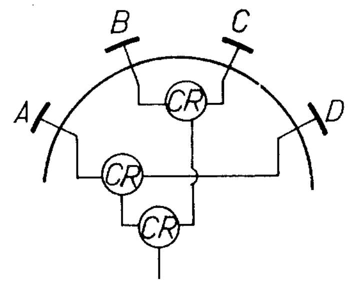
FIG. 2 illustrates an example of a combination of circuits according to the invention, this example being for two pairs of antenna elements.

FIG. 2 illustrates the case in which two pairs of radiating elements are distributed across a convex surface. The employment of three switching and distributing assemblies (marked CR) of the type shown in FIG. 1 makes it possible to obtain the following combination for applying energy to the radiating elements :

A, B, C, D
A + D, B + C, A + C, B + D, C + D, A + B
A+B+C , B+C+D, C+D+A, D+A+B
A+B+C+D .

With the assistance given by the said FIG. 2 it will be easily understood that the employment of the convex form and of the simple distribution of energy makes it possible to deflect the maximum portion of the radiating lobe.

Figure 3:
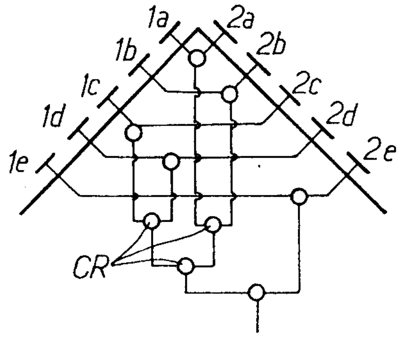
FIG. 3 illustrates a similar example of a combination of circuits according to the invention, this example being for five pairs of antenna elements.

In FIG. 3, an example is to be seen of five pairs of radiating elements 1*a* to 1*e*, 2*a* to 2*e*, distributed across the two surfaces of a dihedron. This assembly of ten radiating elements necessitates nine switching and distributing assemblies (marked CR).

In a more general manner, if the switching and the distributing functions are associated together, in accordance with the invention, it is sufficient, in order to have $2^{2n}$ possible associations given $2n$ radiating elements, to have $2N-1$ switching and distributing assemblies, whereas it would be necessary to have $4(2n-1)$ switches and $N+1$ dividers if the said functions were separate.

It will be appreciated that, in order to create a combination-type circuit of 2n sources of high-frequency energy while employing switching and distributing assemblies like the one above, the energy sources are linked in pairs by the above-mentioned switching and distributing assemblies, and so on in sequence, so as finally to arrive at a single output path, the circuit being also capable of operating in the reverse direction.

It is apparent that modifications may be made in the embodiment above described, for example by substituting technical means that are equivalent, without however thereby going beyond the scope of the invention as defined in the appended claims.

I claim:

1. A combination-type circuit to connect four high-frequency energy transmission paths to another and final transmission path, the circuit comprising three transferring devices, of which one transferring device connects said final transmission path to the second and the third transferring devices, the second transferring device connects a first two of said four paths to said first transferring device, and the third transferring device connects the other two of said four paths to said first transferring device, each transferring device having first, second and third terminals, the first terminal of said first transferring device being connected to said final transmission path, the second terminal of said first transferring device being connected to the first terminal of the second transferring device, the third terminal of said first transferring device being connected to the first terminal of said third transferring device, the second and third terminals of said second transferring device being connected to said first two paths of said four paths, and the second and third terminals of said third transferring device being connected to the other two of said four paths, each transferring device also including conductors electrically connecting its first terminal to its second and third terminals at a branching point, two switching diodes each connected at one end to ground, as regards the high-frequency energy, and each connected at the other end to one of said conductors at a point located at a distance equal to a quarter of the length of the operating wave from said branching point, first voltage supply means for supplying a first voltage which causes conduction of said diodes, second voltage means for supplying a second voltage which causes said diodes to be non-conductive, and three position switching means selectively connecting said diodes to said first and second voltage supply means for selectively connecting each said first terminal to either one of said second and third terminals or to both said second and third terminals.

2. A combination-type circuit to connect 2n paths for transmitting high-frequency energy with $N > 2$ to a final transmission path, in which circuit the 2n transmission paths are associated in pairs, one pair being connected by means of a transferring device to said final transmission path and each of the remaining pairs being connected by means of a transferring device to a single transmission path of a preceding pair of paths, each transferring device having three terminals by means of which the aforesaid connections are made, conductors electrically connecting a first terminal of each such three terminals to the second and third terminals of each such three terminals at a branching point, two switching diodes each connected at one end to ground, as regards the high-frequency energy, and each connected at the other end to one of said conductors at a point located at a distance equal to one quarter of the length of the operating wave from said branching point, first voltage supply means for supplying a first voltage which causes conduction of said diodes, second voltage means for supplying a second voltage which causes said diodes to be non-conductive, and three position switching means selectively connecting said diodes to said first and second voltage supply means for selectively connecting each said first terminal to either one of said second and third terminals or to both said second and third terminals.

* * * * *

UNITED STATES PATENT OFFICE

CERTIFICATE OF CORRECTION

Patent No. 3,720,888 Dated March 13, 1973

Inventor(s) Bertrand Claude Marcel Jean MANUALI

It is certified that error appears in the above-identified patent and that said Letters Patent are hereby corrected as shown below:

Title page, in the heading, [75] Inventor:, "Villera-sur-Orge, France" should read -- Villiers-sur-Orge, France --; Title page, [73] Assignee:, "Centre National D'Eutdes Spatiales" should read -- Centre National D'Etudes Spatiales --.

Signed and sealed this 11th day of June 1974.

(SEAL)
Attest:

EDWARD M.FLETCHER,JR.
Attesting Officer

C. MARSHALL DANN
Commissioner of Patents